US008001242B2

(12) United States Patent
Mild et al.

(10) Patent No.: US 8,001,242 B2
(45) Date of Patent: Aug. 16, 2011

(54) METHOD FOR REDIRECTION OF HOST DATA ACCESS TO MULTIPLE NON-HOST FILE SYSTEMS OR DATA STORES

(75) Inventors: Wilhelm Mild, Boeblingen (DE); Ingo Franzki, Schoenaich (DE); Karsten Graul, Stuttgart (DE); Joerg Schmidbauer, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 10/139,767

(22) Filed: May 6, 2002

(65) Prior Publication Data

US 2002/0169830 A1  Nov. 14, 2002

(30) Foreign Application Priority Data

May 8, 2001 (DE) .................................. 01111036

(51) Int. Cl.
*G06F 15/16* (2006.01)
(52) U.S. Cl. ....................................................... 709/225
(58) Field of Classification Search .................. 709/206, 709/207, 217, 219, 227, 231, 238, 245, 225; 710/1, 22, 48, 52, 56; 711/112, 136, 154; 340/7.21, 7.29, 7.51; 707/1, 4, 10
See application file for complete search history.

(56) References Cited

U.S. PATENT DOCUMENTS

| 5,329,619 A | * | 7/1994 | Page et al. | 709/203 |
| 5,379,419 A | * | 1/1995 | Heffernan et al. | 707/4 |
| 5,745,748 A | * | 4/1998 | Ahmad et al. | 1/1 |
| 5,754,830 A | * | 5/1998 | Butts et al. | 719/311 |

(Continued)

OTHER PUBLICATIONS

Replication Agents for IMS and VSAM Installation Guide for MVS. Jun. 9, 1997. pp. 1-1:17.*

(Continued)

*Primary Examiner* — William C Vaughn, Jr.
*Assistant Examiner* — Scott Christensen
(74) *Attorney, Agent, or Firm* — Cantor Colburn LLP; William A. Kinnaman, Jr.

(57) ABSTRACT

The present invention discloses a system and method for automatic redirection of record-based data access to host files to multiple non-host file systems having non-record-based access comprising a redirector engine, a redirector server and at least one handler. The redirector engine, located on the host side, gets automatic control for each request of a host application (e.g., a read/write request), interprets a property list containing information on whether and how redirection for that request should be processed, makes a redirect decision based on information received from the property list, and establishes a communication with its assigned redirector server. The redirector server, located on a non-host system, handles communication with the redirector engine and the handler, performs data conversions if required and passes control to the handler assigned in the property list. The handler component converts the initial request into a request specific to the non-host file system, controls the execution of the request, and returns the result to the redirector engine. A main advantage of the present invention is that heterogeneous systems using different file systems can work on the same data store without any modification of the host applications themselves. A synchronization of data between the host system and non-host systems can be selected very easily by setting the appropriate parameter in the property list. The data can be stored in different file systems or data stores simultaneously. Finally, the host program is able to access data in different file system, in different encoding formats at the same time in real time.

8 Claims, 3 Drawing Sheets

U.S. PATENT DOCUMENTS

| | | | | |
|---|---|---|---|---|
| 5,758,125 | A * | 5/1998 | Misinai et al. | 703/23 |
| 5,819,251 | A * | 10/1998 | Kremer et al. | 707/1 |
| 5,867,648 | A * | 2/1999 | Foth et al. | 709/230 |
| 5,987,523 | A * | 11/1999 | Hind et al. | 709/245 |
| 6,389,457 | B2 * | 5/2002 | Lazaridis et al. | 709/207 |
| 6,496,865 | B1 * | 12/2002 | Sumsion et al. | 709/229 |
| 6,530,078 | B1 * | 3/2003 | Shmid et al. | 717/138 |
| 6,609,126 | B1 * | 8/2003 | Smith et al. | 707/8 |
| 6,678,700 | B1 * | 1/2004 | Moore et al. | 707/200 |
| 6,938,052 | B2 * | 8/2005 | Mild et al. | 707/104.1 |
| 2001/0051955 | A1 * | 12/2001 | Wong | 707/201 |
| 2002/0083120 | A1 * | 6/2002 | Soltis | 709/200 |
| 2003/0037202 | A1 * | 2/2003 | Kedem et al. | 711/100 |

OTHER PUBLICATIONS

Kienzle et al., Multimedia file serving with the OS/390 LAN Server, IBM Systems Journal, vol. 36 No. 3, 1997.*

The Authoritative Dictionary of IEEE Standards Terms, Dec. 2000, IEEE Press, Seventh Edition, p. 210.*

Microsoft Computer Dictionary, 2002, Microsoft Press, Fifth Edition, p. 121.*

* cited by examiner

| Catalog | Filename | Exit | Owner | IP | Port | Handler | Options |
|---|---|---|---|---|---|---|---|
| MASTER | FileA | Redirect | REDIR | 9.122.110 | 4711 | jdbc:DB2 | USR=John |
| USERCAT | FileB | VENDEX | VSAM | n/a | n/a | n/a | |
| USERCAT | FileC | Redirect | VSAM | 9.121.010 | 7212 | flatfile | SYS=WIN |

METHOD FOR REDIRECTION OF HOST DATA ACCESS TO MULTIPLE NON-HOST FILE SYSTEMS OR DATA STORES

BACKGROUND OF THE INVENTION

1. Field of the Invention

The present invention relates to a system and method for accessing data stored on non-host systems with multiple non-host file systems and, in particular, to a system and method for accessing non-host data via host application programs using record-based access methods.

2. Description of the Related Art

Application programs in the host environment frequently use record-based access methods. For example, the IBM VSE/ESA host operating system uses the record-based access method Virtual Storage Access Method (VSAM) to access data. VSAM does not provide information relating to the internal structure of the data; the application itself must provide this information. Furthermore, host data is stored in EBCDIC (Extended Binary-Coded Decimal Interchange Code) format. EBCDIC is a binary code for alphabetic and numeric characters that IBM has developed for its larger operating systems. In each EBCDIC file, each alphabetic or numeric character is represented by an 8-bit binary number. In contrast to the VSAM data access method, data access methods for non-host file systems use a table row providing information about the structure of the data to be accessed. The application itself does not provide any information relating to the structure of the data to be accessed. Furthermore, data of non-host systems is stored in ASCII format. ASCII is the most common format for text files in computers on the Internet. In an ASCII file, each alphabetic, numeric, or special character is represented by a 7-binary digit number. Therefore, the VSAM access method is not compatible with any access method for non-host systems.

Host systems use a great number of applications, which have been developed over a long period of time. New technologies like Internet technologies or e-business applications are mainly based on UNIX platforms using non-record-based access methods. Therefore, the major growth in the future is not located in the host system environment using proprietary record-based access methods like VSAM, but in the UNIX or Linux environment using non-record-based access methods. In order to protect the investments in the host sector, it is desirable that the host applications can work without any change with data stored on the new platforms.

Furthermore, VSAM data must be transferred from the host environment to the UNIX or Linux environment in a relatively simple way.

SUMMARY OF THE INVENTION

It is therefore an object of the present invention to provide a system and method of data access by existing host applications to data stored on non-host systems using non-host access methods without changing the host applications themselves.

It is a further object of the present invention to easily provide data from the host systems to the non-host systems using multiple non-host file systems.

It is a further object of the present invention to store the data in different remote file systems simultaneously.

Finally, it is an object of the present invention to provide synchronisation of data between the host and the non-host system.

These objects are achieved by the features of the independent claims. Further preferred embodiments of the present inventions are laid down in the dependent claims.

The present invention contemplates a system and method for automatic redirection of record-based data access to host files to multiple non-host file systems having non-record-based access comprising a redirector engine, a redirector server and at least one handler. The redirector engine, located on the host side, gets automatic control for each request of a host application (e.g., a read/write request), interprets a property list containing information on whether and how redirection for that request should be processed, makes a redirect decision based on information received from the property list, and establishes a communication with its assigned redirector server. The redirector server, located at a non-host system, handles communication with the redirector engine and the handler, makes data conversion if required and passes control to the handler specified in the property list. The handler component converts the initial request into a request specific to the non-host file system, controls the execution of the request, and returns the result to the redirector engine.

A main advantage of the present invention is that heterogeneous systems using different file systems can work on the same data store without any modification of the host applications themselves. A synchronization of data between host system and non-host systems can be selected very easily by setting the appropriate parameter in the property list. The data can be stored in different file systems or data stores simultaneously. Finally, a host program is able to access data in different file system, in different encoding formats, at the same time in real time.

BRIEF DESCRIPTION OF THE DRAWINGS

Embodiments of the present invention will now be described, by a way of example, with reference to the accompanying drawings, in which.

DESCRIPTION OF THE PREFERRED EMBODIMENT

Figures 1, 2:
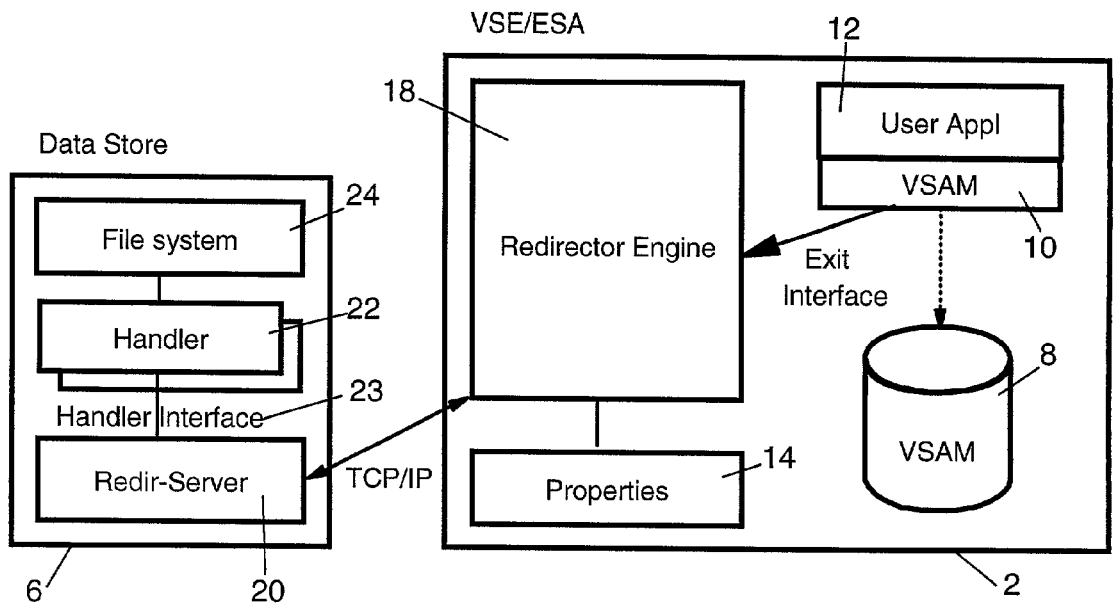
FIG. 1 shows a preferred embodiment of the inventive redirector.
FIG. 2 shows the structure and the content of a parameter list as used by the present invention.

FIG. 1 shows a preferred embodiment of the present invention implemented partly on a host system or mainframe 2 (e.g., an IBM eServer with an IBM VSE/ESA operating system) and partly on a non-host system 6 (e.g., a system with any UNIX-like operating system). The host system 2 includes host applications 12 using VSAM 10 for accessing VSAM data 8. The VSAM data 8 is stored in EBCDIC-encoded format. The non-host system 6 uses a non-record-based access method (e.g., a relational access method) that is not compatible with the access methods of the host system 2. Furthermore, the data of the non-host system 6 is stored in ASCII-encoded format. The inventive redirector consists of the following three components: a redirector engine 18, a redirector server 20, and a handler 22. Redirector engine 18 is installed on the host system side 2, and redirector server 20 and handler 22 are installed on the non-host system side 6.

The redirector engine 18 has the following functionalities:
1. It gets control for each VSAM request initiated by a host application program 12. (Redirector engine 18 uses an exit in the host data access method 10 to intercept all requests.)
2. It interprets a property list (FIG. 2) using information from the VSAM request.
3. It makes the decision to redirect the request to a non-host file system by using information in the property list.
4. It handles communication with the redirector server 20 located on the non-host system 6 and the non-record-based access method.
5. Optionally it can be selected that the redirected request is executed on the non-host system 6 only or in synchronization on the host system 2 as well (see description to FIG. 2).

The redirector server 20 has the following functionalities:
1. It handles communication between redirector engine 18 and handler 22.
2. It performs automatic data conversion from the encoded data format of the host system 2 to the encoded data format of the non-host system 6.
3. It automatically passes control to the appropriate handler 22 via a handler interface 23.
4. Optionally there is provided a common handler interface 23 for all handlers 22, so that new handlers can be implemented easily.

The handler 22 has the following functionalities:
1. It automatically converts an initial request into a request specific to a non-host file system 24 (may be one or more requests depending on the non-host file system).
2. It transforms the data corresponding to the request built.
3. It controls execution of the request built.
4. It returns the result via the redirector server 20 and the redirector engine 18 to the host application 12.

In the embodiment shown, the communication between redirector engine 18 and redirector server 20 is established by using the TCP/IP (Transmission Control Protocol/Internet Protocol) protocol.

The redirector 18, 20, 22 handles requests for VSAM data 8 and redirects them to any non-host data store/file system 24 supported by the handler 22 identified in the property list to be described below. Using the redirector 18, 20, 22, existing host applications 12 on IBM VSE/ESA written in any programming language and running in a batch or online environment (e.g., CICS) can be used without any modification.

FIG. 2 shows the structure and content of a property file 1 used by the present invention. The property file 1 contains the parameters for redirecting the requests to a non-host system 6. The parameters of the property file 1 can be changed or extended by an administrator at any time.

A preferred embodiment of the property file 1 is the list shown in FIG. 2, which contains following parameters:

Catalogue 2 and filename 4: specify for which host catalogue and filename a redirection should be applied; if the host file is not identified in the property list a redirection cannot take place.

Exit 6: specifies the host program that will be invoked for the file.

Owner 8 (either VSAM or REDIR): specifies whether the redirection should be used as a synchronization tool; VSAM in the property list means to work with the original VSAM data and to work synchronously with the data store on the non-host system. This allows one to have the same data on the host as well as on the non-host system, however in another data format. REDIR in the property list is used when no synchronization is required and all data is used from the non-host system. The real-time access to data from the non-host system is transparent to the host application.

IP (Internet Protocol) address 10 and Port 12: specify the network address of the non-host system and the port to be used.

Handler 14: specifies the handler to be invoked by the redirector server.

Options 16: specifies access or manipulation options for data.

The above-explained property list 1 is only a preferred embodiment. The property list 1 may be extended by further parameters.

Figure 3:
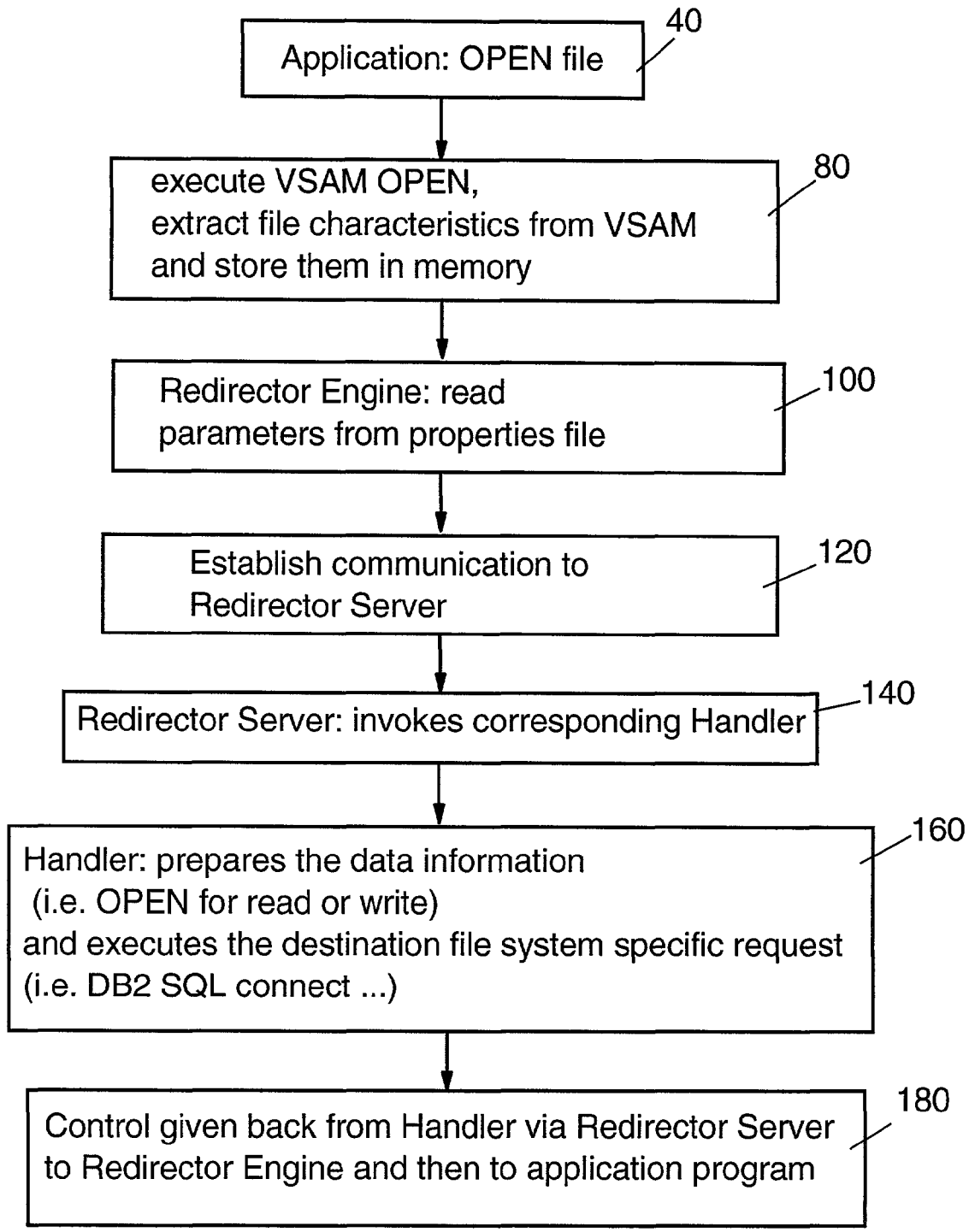
FIG. 3 shows the method steps of an open request according to the present invention.

FIG. 3 shows the method steps of an open request according to the present invention.

The host application 12 initiates an open request via an ACB (access control block) containing a filename and a catalogue name (step 40). With both items of information a control block structure is built in the memory of the host for further requests (step 80). The control block structure contains information about the organization and accessing of the file to be accessed. For each open request such a control block structure is built.

After the successful opening of a file, VSAM 10 activates the redirector engine 18 without informing the application 12. Using the information contained in the open request, the redirector engine 18 reads the property list 1 and checks for an entry with the same catalogue and filename parameters to determine whether a redirection should take place at all; a redirection only takes place when the filename and catalogue name of the open request are contained in an entry of the property list 1 (step 100).

The owner parameter is not checked for an open request, only for a read/write request (FIG. 4) as described below. However, the IP address, port and handler name are used for each redirection of an VSAM open request. More particularly, the redirector engine 18 opens a session with the redirector server 20 using the IP address and port address contained in the property list 1 and sends a data package with a parameter list containing the type of request (open in this case), filename, catalogue name, and name of the handler 22; the data package is sent to the redirector server using TCP/IP protocol (step 120).

The redirector server 20 performs data conversion of the package if required and invokes the handler 22 specified in the parameter list (step 140). Upon being invoked, the handler 22 executes a file system-specific request (e.g., DB2 SQL connect . . . ) corresponding to the VSAM open request using the information contained in the parameter list (step 160). After a successful open, a return message is sent from the handler 22 via the redirector server 20 to the redirector engine 18, giving back control to the host program 12 (step 180).

Figure 4:
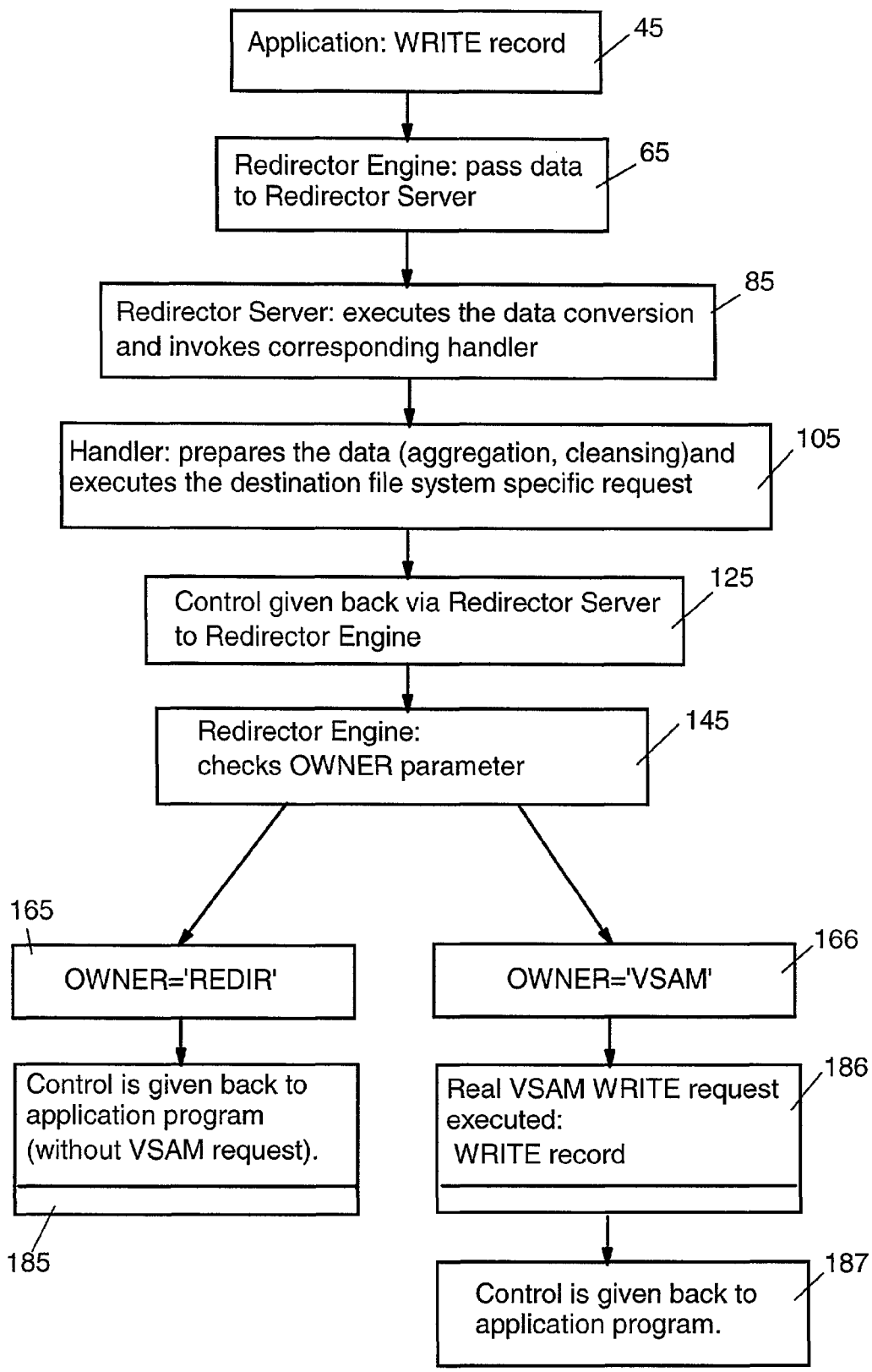
FIG. 4 shows the method steps of a read/write request according to the present invention.

FIG. 4 shows the method steps for a read/write request according to the present invention. The host application 12 generates a write request containing data to be modified (step 45). The redirector engine 18 then gets control and creates a parameter list including the type of request (here a write request), data to be modified, filename, catalogue name, and handler name by using the parameters from the property file 1. A data package containing the parameter list is directly sent via the redirector server 20 to the handler 22 specified in the property list (steps 65, 85). Communication parameters like IP address and IP port are not needed since the communication is still open from the open request. Preferably, at first the handler 22 prepares the data received in a more usable structure independent of the addressed non-host file system requirements. This operation is done in memory (e.g., memory of the file system or cache). Dependent on the respective file system, one or more requests are created and executed as a unit or single transaction (step 105). The assigned handler 22 transforms the request into the corresponding file-specific request (e.g., SELECT (read) or INSERT (write) and executes it. It is also possible to use more handlers 22 to read/write the data to another file system.

Upon the completion of execution on the non-host system 6, control is given back to the redirector engine 18, and further execution on the host system 2 depends on the owner specified in the property list 1 (step 125). If the owner specified in the property list 1 is REDIR (step 165), control is given back to the host application 12 without accessing VSAM 10 (step 185). On the other hand, if the owner specified in the property list 1 is VSAM (step 166), normal VSAM processing of the request is continued and the write request is also performed on the VSAM data 8, thereby securing a synchronization between the VSAM data 8 and the non-VSAM data 24 (step 186). Control is then given back to the application program 12 (step 187).

The owner parameter therefore has an important function of allowing use of the redirector engine 18 either as a synchronization mechanism between different file systems or as a simple redirection to other common data stores. With the large number of host applications in various programming languages running on a host system (e.g. IBM VSE/ESA), it is very important to let them run unchanged with data stored on different platforms (e.g., relational databases, flat files) in real time.

In the case of read requests, the original host data structure is rebuilt before the data is returned to the host application 12. The handler 22 is responsible for this step. In the next step the data conversion from ASCII to EBCDIC takes place by redirector server 20 and then the data is sent via the redirector engine 18 to host application 12.

The invention also allows one to migrate host data to another non-host file system 24 by using the redirector as follows. The property list 1 is prepared in such a way that the owner parameter is VSAM. The options parameter in the property list 1 is set to "migrate". That means that any host application 12 that entirely reads the host file will cause a migration of this data via the specified handler 22. The host application 12 initiates a read request to the host data. The redirector 18 engine is automatically invoked and takes control of the read process. The owner parameter in the property list 1 is in this case VSAM, which means that the read is done by VSAM 10. After the read process is done and host data is in memory, the redirector engine 18 interprets the option parameter, which is migrate. In this case the parameter list created includes the type of request, which is set to write data. The parameter list is sent to the handler 22 via the redirector server 20.

The main advantages of the present invention may be summarized as follows. Unchanged host applications can access via their traditional access methods (record-based access) data residing in different platforms using non-record-based access methods. The redirection decision is made for each individual request. A synchronization of data between host system and non-host systems can be selected very easily by setting the appropriate parameter in the property list. The data can be stored in different file systems or data stores simultaneously. Finally, the host program is able to access data in different file system, in different encoding formats at the same time in real time.

What is claimed is:

1. A method for automatic redirection of a record-based data access via a request for host data stored on a host computer system having a host operating system to a non-record-based data access to non-host data stored on a remote non-host computer system, said host computer system having a host application which generates requests for host data and a record-based access component for accessing said host data, said method comprising the a process performed on said host computer system comprising:

intercepting said request for said host data from said host application of said host computer system to said record-based access component of said host computer system;

accessing an entry in a property list stored on said host computer system, said entry corresponding to the host data being requested and specifying a manner of handling a request for said host data, said entry in said property list specifying whether to redirect said request to said remote non-host computer system, wherein the property list includes a host catalogue field and a filename field specifying for which host catalogue and filename a redirection of the record-based data access takes place, and wherein the property list further includes an owner field specifying whether the redirection should be used as a synchronization tool; and based on an indication by said entry in said property list to redirect said request to said remote non-host computer system, redirecting said request in real time to said remote non-host computer system for processing as a non-record-based data access to said non-host data stored on said remote non-host computer system;

if the owner field specifies a virtual storage access method (VSAM), processing said request to obtain synchronization between said host and said non-host data based on the accessed entry in the property list; and if the owner field indicates a redirection, processing said request using said non-host data without synchronization with said host data based on the accessed entry in the property list;

wherein the property list includes a host catalogue field and a filename field specifying for which host catalogue and filename a redirection of the record-based data access takes place;

wherein said remote non-host computing system has a different operating system from said host operating system and said non-host data is stored on said remote non-host computer system separately from said host data on said host computer system.

2. The method of claim 1, wherein said entry in said property list indicates which of a plurality of non-host computer systems to redirect said request to.

3. The method of claim 1, further comprising:

receiving a result of said non-record-based data access from said remote non-host computer system; and returning said result to said host application.

4. The method of claim 1, further comprising performing on said remote non-host computer system:

receiving said request for host data from said host computer system;

processing said request for host data in real time as a non-record-based data access to data stored on said remote non-host computer system; and returning a result of said non-record-based data access to said host computer system.

5. The method of claim 4, further comprising performing on said host computer system:

receiving said result to said host application.

6. The method of claim 1, further comprising:
responsive to an indication by said entry in said property list to update record-based data on said host computer system, updating record-based data on said host computer system in real time to synchronize said record-based data with non-record-based data on said remote non-host computer system that has been updated in response to said request.

7. A computer program product stored on a non-transitory computer-readable medium, containing software code that when executed by a host computer system causes the host computer system to perform a method for automatic redirection of a record-based data access via a request for host data stored on the host computer system, said host computer system having a host application which generates requests for host data and a record-based access component for accessing said host data, said method comprising the a process performed on said host computer system comprising:
intercepting said request for said host data from said host application of said host computer system to said record-based access component of said host computer system;
accessing an entry in a property list stored on said host computer system, said entry corresponding to the host data being requested and specifying a manner of handling a request for said host data, said entry in said property list specifying whether to redirect said request to said remote non-host computer system,
wherein the property list includes a host catalogue field and a filename field specifying for which host catalogue and filename a redirection of the record-based data access takes place, and
wherein the property list further includes an owner field specifying whether the redirection should be used as a synchronization tool; and
based on an indication by said entry in said property list to redirect said request to said remote non-host computer system, redirecting said request in real time to said remote non-host computer system for processing as a non-record-based data access to said non-host data stored on said remote non-host computer system;
if the owner field specifies a virtual storage access method (VSAM), processing said request to obtain synchronization between said host and said non-host data based on the accessed entry in the property list; and
if the owner field indicates a redirection, processing said request using said non-host data without synchronization with said host data based on the accessed entry in the property list;
wherein the property list includes a host catalogue field and a filename field specifying for which host catalogue and filename a redirection of the record-based data access takes place;
wherein said remote non-host computing system has a different operating system from said host operating system and said non-host data is stored on said remote non-host computer system separately from said host data on said host computer system.

8. A system for automatic redirection of a record-based data access via a request for host data stored on a host computer system having a host operating system to a non-record-based data access to non-host data stored on a remote non-host computer system, said host computer system having a host application which generates requests for host data and a record-based access component for accessing said host data, said system comprising:
a computer processor; and
a non-transitory computer readable storage medium storing instructions that when executed by the processor performs a method comprising:
intercepting a said request for said host data from said host application of said host computer system to said record-based access component of said host computer system;
accessing an entry in a property list stored on said host computer system, said entry corresponding to the host data being requested and specifying a manner of handling a request for said host data, said entry in said property list specifying whether to redirect said request to said remote non-host computer system,
wherein the property list includes a host catalogue field and a filename field specifying for which host catalogue and filename a redirection of the record-based data access takes place, and
wherein the property list further includes an owner field specifying whether the redirection should be used as a synchronization tool; and
based on an indication by said entry in said property list to redirect said request to said remote non-host computer system, redirecting said request in real time to said remote non-host computer system for processing as a non-record-based data access to said non-host data stored on said remote non-host computer system;
if the owner field specifies a virtual storage access method (VSAM), processing said request to obtain synchronization between said host and said non-host data based on the accessed entry in the property list; and
if the owner field indicates a redirection, processing said request using said non-host data without synchronization with said host data based on the accessed entry in the property list;
wherein the property list includes a host catalogue field and a filename field specifying for which host catalogue and filename a redirection of the record-based data access takes place;
wherein said remote non-host computing system has a different operating system from said host operating system and said non-host data is stored on said remote non-host computer system separately from said host data on said host computer system.

* * * * *